United States Patent
Fujio et al.

(10) Patent No.: US 12,292,546 B2
(45) Date of Patent: May 6, 2025

(54) RAINDROP DETECTION DEVICE, RAINDROP DETECTION METHOD, AND RAINDROP DETECTION PROGRAM

(71) Applicant: OMRON CORPORATION, Kyoto (JP)

(72) Inventors: Kohei Fujio, Kyoto (JP); Shinichi Kinoshita, Kyoto (JP); Shingo Kawamoto, Kyoto (JP); Muneharu Miyakoshi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 162 days.

(21) Appl. No.: 18/056,735

(22) Filed: Nov. 18, 2022

(65) Prior Publication Data

US 2023/0204818 A1 Jun. 29, 2023

(30) Foreign Application Priority Data

Dec. 28, 2021 (JP) ................. 2021-214764

(51) Int. Cl.
*G01W 1/14* (2006.01)
*G01N 21/59* (2006.01)

(52) U.S. Cl.
CPC .............. *G01W 1/14* (2013.01); *G01N 21/59* (2013.01)

(58) Field of Classification Search
CPC .......... G01W 1/14; G01W 1/00; G01N 21/59; G01N 15/06; Y02A 90/10
See application file for complete search history.

(56) References Cited

U.S. PATENT DOCUMENTS

| | | | | |
|---|---|---|---|---|
| 4,481,450 A * | 11/1984 | Watanabe | ............... | E05F 15/71 318/DIG. 2 |
| 5,386,111 A * | 1/1995 | Zimmerman | ......... | B60S 1/0822 250/227.25 |
| 6,232,603 B1 * | 5/2001 | Nelson | ................... | G06V 20/56 250/341.8 |
| 2014/0303853 A1 * | 10/2014 | Itoh | ......................... | B60R 11/04 348/148 |
| 2015/0168299 A1 * | 6/2015 | Kim | ..................... | G01N 21/958 356/445 |
| 2020/0018699 A1 | 1/2020 | Kawasaki et al. | | |

FOREIGN PATENT DOCUMENTS

| | | | |
|---|---|---|---|
| JP | 2008157765 A | * | 7/2008 |
| JP | 2020-8505 A | | 1/2020 |
| WO | 2019/216184 A1 | | 11/2019 |

* cited by examiner

*Primary Examiner* — Abdullahi Nur
(74) *Attorney, Agent, or Firm* — METROLEX IP LAW GROUP, PLLC; Robert L. Scott, Esq.

(57) ABSTRACT

A raindrop detection device 10 includes an LED 11, a photodiode 14, a microprocessor 20, and an LED flashing circuit 22. The LED 11 emits light in a specific direction. The photodiode 14 is disposed at a position opposite the LED 11 and receives light emitted from the LED 11. The microprocessor 20 detects raindrops that have passed between the LED 11 and the photodiode 14, according to the change in the amount of light received by the photodiode 14. The LED flashing circuit 22 controls the on and off switching of light emitted from the LED 11.

18 Claims, 11 Drawing Sheets

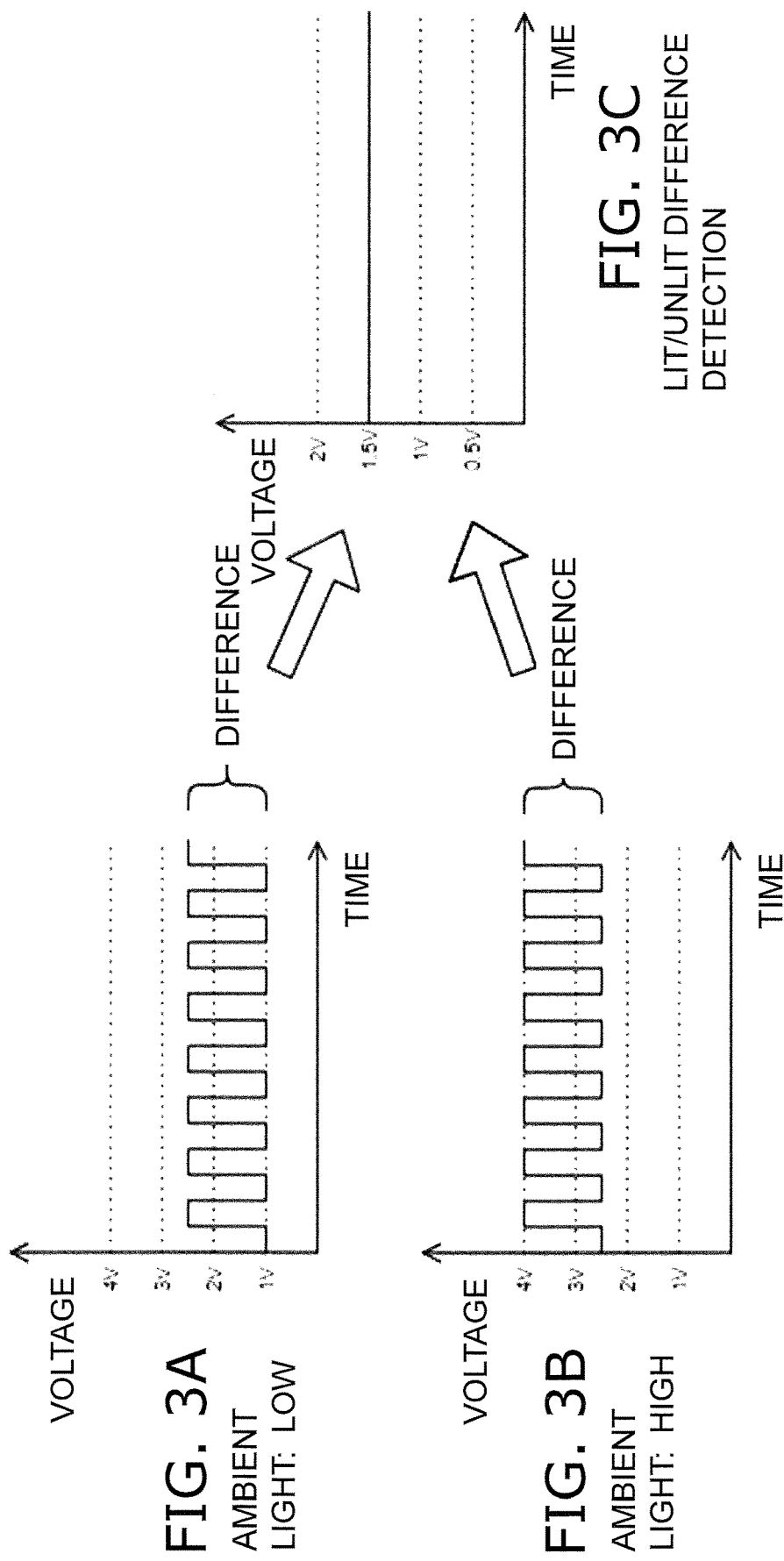

DATA ACQUIRED AT 4:47:00 TO 4:47:59 P.M. ___(YY) ___(MM) ___(DD)

| TIME (ms) | VOLTAGE (V) | DIAMETER (mm) | VOLUME (mm³) |
|---|---|---|---|
| 0.6 | 0.05 | 0.49 | 0.062 |
| 0.5 | 0.17 | 1.103 | 0.703 |
| 0.7 | 0.09 | 0.732 | 0.205 |
| 0.9 | 0.03 | 0.382 | 0.029 |
| 0.7 | 0.12 | 0.876 | 0.352 |
| 0.6 | 0.11 | 0.828 | 0.298 |
| 0.7 | 0.03 | 0.35 | 0.023 |
| 0.5 | 0.22 | 1.262 | 1.052 |
| 0.9 | 0.06 | 0.589 | 0.107 |
| 0.5 | 0.12 | 0.897 | 0.378 |
| 0.4 | 0.26 | 1.4 | 1.436 |
| 0.6 | 0.16 | 1.054 | 0.612 |
| 0.8 | 0.12 | 0.865 | 0.339 |
| 1.1 | 0.03 | 0.363 | 0.025 |

FIG. 5A

| TOTAL VOLUME | 5.621 | mm3 |
|---|---|---|
| RAINFALL | 0.0057 | mm/MINUTE |
| RAINFALL | 0.3407 | mm/HOUR |

FIG. 5B

RAINDROP DETECTION DEVICE, RAINDROP DETECTION METHOD, AND RAINDROP DETECTION PROGRAM

CROSS-REFERENCE TO RELATED APPLICATIONS

This application claims priority to Japanese Patent Application No. 2021-214764 filed on Dec. 28, 2021. The entire disclosure of Japanese Patent Application No. 2021-214764 is hereby incorporated herein by reference.

BACKGROUND

Technical field

The present invention relates to a raindrop detection device, a raindrop detection method, and a raindrop detection program for detecting raindrops.

Description of the Related Art

In order to measure rainfall, conventional methods involved the use of a water receptacle that collected rainwater, a water filter that dripped out the rainwater received by the water receptacle, and a tipping bucket rain gauge equipped with a tipping bucket that tipped over after filling with the rainwater dripping from the water filter.

For example, Patent Literature 1 discloses a tipping bucket rain gauge, the object of which is to facilitate operation by allowing rainwater to be continuously and accurately measured even if the rainfall value is large, and in which periodic maintenance work is unnecessary, wherein a water filter is constituted by a gutter-shaped first water filter that is provided at an angle to the falling direction of rainwater received from a water receiving unit, and that receives rainwater by changing the flow direction of the rainwater received from the water receiving unit; and a second water filter that has a bottomless vessel-shaped part in which the water receiving end covers the area around the outflow end of the first water filter and an opening is formed in the outflow end, in which this second water filter is provided at an angle to the falling direction of rainwater received from the first water filter, and changes the downflow direction of the rainwater flowing out of the first water filter into the direction of the tipping bucket and thereby causes the rainwater flowing out of the first water filter to drip into the tipping bucket.

Also, Patent Literature 2 discloses a configuration of a droplet sensor having a wide detection surface area and high sensitivity with a simple configuration, wherein an optical cover, which is formed by a part of a spheroid and whose vertical axis is the major axis of the spheroid, has an effective detection area between the light-emitting part and the reflection part, the effective detection area satisfies a total reflection condition at the interface with a gas and does not satisfy a total reflection condition at the interface with a liquid, and the reflection part reflects the light totally reflected in the detection area toward the light receiving surface of a light receiver/emitter, or reflects the light directly incident on the reflecting part from the light receiver/emitter toward the effective detection area.

CITATION LIST

Patent Literature
Patent Literature 1: International Application Publication WO 2019/216184
Patent Literature 2: JP-A 2020-8505

SUMMARY (Problem to be Solved by the Invention)

However, the following problem was encountered with the conventional configuration described above.

The tipping bucket rain gauge disclosed in the above-mentioned Patent Literature 1 is a type in which the bucket tips over once the rainfall reaches an equivalent of 0.5 mm, so it was difficult to detect raindrops when the rainfall was less than 0.5 mm. Another problem was that it took a while for the tipping bucket to tip over after rain began to fall, which meant that the point when the start of rainfall was detected was delayed.

Also, although the droplet sensor disclosed in Patent Literature 2 did allow for detection very soon after rain started to fall, it was difficult to measure the amount of rainfall accurately.

It is an object of the present invention to provide a raindrop detection device, a raindrop detection method, and a raindrop detection program with which even a small amount of rainfall can be accurately detected from when the rain starts falling.

(Means for Solving Problem)

The raindrop detection device according to the first invention comprises a light source unit, a light receiving unit, a raindrop detection unit, and a control unit. The light source unit emits light in a specific direction. The light receiving unit is disposed at a position opposite the light source unit and receives the light emitted from the light source unit. The raindrop detection unit detects raindrops that have passed between the light source unit and the light receiving unit according to the change in the amount of light received by the light receiving unit. The control unit controls the on and off switching of the light emitted from the light source unit.

Here, the light source unit and the light receiving unit are disposed at positions opposite each other, and when raindrops pass through the raindrop detection area formed between the light source unit and the light receiving unit, the amount of light received by the light receiving unit decreases, so raindrops are detected on the basis of this reduced amount of received light.

Here, the light source unit is, for example, an LED (light emitting diode), which emits light in a specific direction with respect to the light receiving unit disposed opposite thereto at a specific gap.

The light receiving unit is, for example, a photodiode, which receives light emitted from the light source unit and outputs a voltage value.

The detection of raindrops includes, for example, the sensing of the diameter of raindrops, the volume of a single raindrop, the amount of rainfall per unit of time, the speed of raindrops, etc.

Consequently, raindrops can be detected one by one on the basis of the decrease in the amount of received light due to blockage of the light by the raindrops passing through the raindrop detection area.

As a result, even a small amount of rain can be accurately detected from when the rain starts to fall.

The raindrop detection device according to the second invention is the raindrop detection device according to the first invention, wherein the control unit performs control so as to repeatedly turn the light source unit on and off.

Here, the turning off of the light source unit includes not only completely turning it off, but also substantially turning it off.

Consequently, the influence of ambient light can be eliminated from raindrop detection because the control unit detects the change in the amount of light received by the light receiving unit while repeatedly turning on and off the light emitted from the light source unit, such as by subtracting the amount of received light when the light source unit is lit from the amount of received light when the light source unit is unlit.

The raindrop detection device according to the third invention is the raindrop detection device according to the second invention, wherein the light receiving unit has a difference output unit that outputs the difference in the amount of light received when the light source unit is lit and when the light source unit is unlit, as a voltage.

Consequently, for example, it is possible to suppress the influence of ambient light and accurately detect a decrease in the amount of light received due to the passage of raindrops.

The raindrop detection device according to the fourth invention is the raindrop detection device according to the third invention, wherein the control unit performs feedback control to change the output of the light source unit so that the difference stays constant.

Consequently, even if the amount of light received changes due to, for example, the temperature of the light source unit (such as an LED), deterioration of the light source unit, fogging of the lens, etc., raindrops can be detected stably by performing feedback control to raise the output of the light source unit.

The raindrop detection device according to the fifth invention is the raindrop detection device according to the fourth invention, further comprising an averaging processing unit that averages the difference and transmits the result to the control unit.

Consequently, raindrops can be detected more stably by performing averaging processing so that detection will not be affected by changes in the amount of light received when raindrops are detected.

The raindrop detection device according to the sixth invention is the raindrop detection device according to any of the first to fifth inventions, wherein the raindrop detection unit senses the diameter of one raindrop on the basis of the decrease in the difference in the amount of received light when the light source unit is lit and when the light source unit is unlit.

Consequently, the diameter of one raindrop can be sensed by using the difference in the amount of light received, which decreases when a raindrop passes through the raindrop detection area, between when the light in the light source unit is lit and when the light is unlit.

The raindrop detection device according to the seventh invention is the raindrop detection device according to any of the first to sixth inventions, wherein the raindrop detection unit calculates the volume of one raindrop on the basis of the decrease in the amount of received light.

Consequently, the volume of one raindrop can be easily calculated from the decrease in the amount of received light sensed by the light receiving unit.

The raindrop detection device according to the eighth invention is the raindrop detection device according to the sixth invention, wherein the raindrop detection unit calculates the volume of one raindrop on the basis of the diameter.

Consequently, the volume of a single raindrop can be easily calculated using the diameter of the raindrop derived from the decrease in the amount of received light sensed at the light receiving unit.

The raindrop detection device according to the ninth invention is the raindrop detection device according to the seventh or eighth invention, wherein the raindrop detection unit sums the volume of the raindrops that have passed between the light source unit and the light receiving unit per specific unit of time from the volume of one raindrop, and divides this sum by the surface area of the area where the raindrops are detected, and thereby calculates the amount of rainfall per unit of time.

Consequently, the amount of rain per unit of time can be easily calculated simply by accumulating the volume of one raindrop.

The raindrop detection device according to the tenth invention is the raindrop detection device according to any of the first to ninth inventions, further comprising a receiving unit that receives information related to wind speed conditions, and a correction unit that corrects the amount of rain per unit of time sensed by the raindrop detection unit according to the wind speed conditions received by the receiving unit.

Consequently, in a situation where raindrops are falling obliquely on a windy day, for example, given that the amount of raindrops entering the raindrop detection area of the raindrop detection device drops due to the wind, the amount of rainfall can be calculated very accurately, keeping the influence of the wind to a minimum, by correcting the amount of rainfall per unit of time according to information related to wind speed information.

The raindrop detection device according to the eleventh invention is the raindrop detection device according to any of the first to tenth inventions, wherein, if the presence of raindrops is detected on the basis of the change in the amount of received light, the raindrop detection unit senses the pulse width of the light received by the light receiving unit when the raindrops were detected, and determines there are no raindrops if the detected pulse width exceeds a specific threshold.

For example, a raindrop with a large diameter will fall at a higher speed, resulting in a smaller pulse width. On the other hand, when the raindrop diameter is large and the pulse width is also large, it is determined that there is a possibility of foreign matter such as fallen leaves other than raindrops, or of some other error.

Consequently, even when raindrops are detected, the pulse width at the time of detection is monitored, and if the pulse width exceeds a specific threshold value, that detection will not be counted as raindrops, thereby preventing foreign matter from being mistakenly counted as raindrops, and malfunction of the raindrop detection device can be detected.

The raindrop detection device according to the twelfth aspect of the invention is the raindrop detection device according to the eleventh aspect, wherein the raindrop detection unit determines whether or not there are raindrops on the basis of the pulse width and the decrease in the amount of received light.

Consequently, it is possible to determine more accurately whether or not something is actually a raindrop by including the decrease in the amount of received light in the determination, in addition to the above-mentioned determination that compares the pulse width with a threshold value.

The raindrop detection device according to the thirteenth invention is the raindrop detection device according to any of the first to twelfth inventions, further comprising a raindrop speed calculation unit that calculates the speed of the raindrops on the basis of the light blocking duration by the raindrops that have passed between the light source unit and the light receiving unit.

Consequently, it is possible to detect not only the amount of rainfall per unit of time, but also the speed of the raindrops, which has the benefit of making it possible to recognize erroneous detection, to detect not only rain but also sleet, hail, snow, etc., and so on, for example.

The raindrop detection device according to the fourteenth invention is the raindrop detection device according to any of the first to thirteenth inventions, wherein a plurality of the light source units are provided.

Consequently, raindrops that have passed through the range of light emitted from the plurality of light source units can be detected on the basis of the change in the amount of light received by the light receiving unit, so the raindrop detection area can be enlarged.

The raindrop detection device according to the fifteenth invention is the raindrop detection device according to any of the first to fourteenth inventions, further comprising a first lens unit that converts the light emitted from the light source unit into parallel light.

Consequently, by collimating the light emitted from the light source unit, raindrops can be stably detected in the raindrop detection area on the basis of the amount of received light that changes when the raindrops pass through the collimated light in the raindrop detection area.

The raindrop detection device according to the sixteenth invention is the raindrop detection device according to the fifteenth invention, further comprising a second lens unit that condenses the light collimated by the first lens unit and guides this light to the light receiving unit.

Consequently, the second lens unit can be used to condense light so that all of the collimated light can be received by the light receiving unit.

The raindrop detection device according to the seventeenth invention is the raindrop detection device according to any of the first to sixteenth inventions, wherein the light source unit emits infrared light.

Consequently, raindrops can be detected by using the infrared light emitted from the light source unit.

The raindrop detection device according to the eighteenth invention is the raindrop detection device according to any of the first to seventeenth inventions, further comprising a blocking filter that is provided on the light receiving surface side of the light receiving unit and blocks visible light.

Consequently, it is possible to prevent ambient light (visible light) from mixing with the light received by the light receiving unit, and prevent a decrease in the raindrop detection accuracy.

The raindrop detection method according to the nineteenth invention is a raindrop detection method that makes use of the raindrop detection device according to any of the first to eighteenth inventions, the method comprising an emission step of emitting light in a specific direction from the light source, a light receiving step of receiving the light emitted from the light source unit at the light receiving unit, which is disposed at a position opposite the light source unit, and a raindrop detection step of detecting raindrops that have passed between the light source unit and the light receiving unit, according to the change in the amount of light received in the light receiving step.

Here, the light source unit and the light receiving unit are disposed at positions opposite each other, and when raindrops pass through the raindrop detection area formed between the light source unit and the light receiving unit, the amount of light received by the light receiving unit decreases, and therefore raindrops are detected on the basis of this reduced amount of received light.

Here, the light source unit is, for example, an LED (light emitting diode), which emits light in a specific direction at the light receiving unit, which is disposed opposite thereto at a specific gap.

The light receiving unit is, for example, a photodiode, receives light emitted from the light source unit, and outputs a voltage value.

The detection of raindrops includes, for example, the sensing of the diameter of raindrops, the volume of a single raindrop, the amount of rainfall per unit of time, the speed of raindrops, etc.

Consequently, raindrops can be detected one by one on the basis of the decrease in the amount of received light due to blockage of the light by the raindrops passing through the raindrop detection area.

As a result, even a small amount of rain can be accurately detected from when the rain starts to fall.

The raindrop detection program according to the twentieth invention is a raindrop detection program that causes a computer to execute a raindrop detection method that makes use of the raindrop detection device according to any of the first to eighteenth inventions, the method comprising an emission step of emitting light in a specific direction from the light source, a light receiving step of receiving the light emitted from the light source unit at the light receiving unit, which is disposed at a position opposite the light source unit, and a raindrop detection step of detecting raindrops that have passed between the light source unit and the light receiving unit, according to the change in the amount of light received in the light receiving step.

Here, disposed at positions opposite each other, and when raindrops pass through the raindrop detection area formed between the light source unit and the light receiving unit, the amount of light received by the light receiving unit decreases, so raindrops are detected on the basis of this reduced amount of received light.

Here, the light source unit is, for example, an LED (light emitting diode), which emits light in a specific direction with respect to the light receiving unit disposed opposite thereto at a specific gap.

The light receiving unit is, for example, a photodiode, which receives light emitted from the light source unit and outputs a voltage value.

The detection of raindrops includes, for example, the sensing of the diameter of raindrops, the volume of a single raindrop, the amount of rainfall per unit of time, the speed of raindrops, etc.

Consequently, raindrops can be detected one by one on the basis of the decrease in the amount of received light due to blockage of the light by the raindrops passing through the raindrop detection area.

As a result, even a small amount of rain can be accurately detected from when the rain starts to fall.

(Effects)

With the raindrop detection device of the present invention, even a small amount of rainfall can be accurately detected from the beginning of rainfall.

BRIEF DESCRIPTION OF THE DRAWINGS

FIGS. 3A, 3B, and 3C are graphs illustrating control for eliminating the influence of ambient light in the raindrop detection device of FIG. 1;

FIG. 5A is a diagram showing a table that is stored in a memory and contains measurement results for voltage values obtained by converting the amount of received light, as well as the diameter and volume of detected raindrops, and FIG. 5B is a diagram showing a table containing the results of calculating rainfall per unit of time from the total volume of raindrops in FIG. 5A;

DETAILED DESCRIPTION OF THE EMBODIMENT

A raindrop detection device according to an embodiment of the present invention will now be described with reference to FIGS. 1 to 10.

In is embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

(1) Configuration of Raindrop Detection Device 10

Figure 1:
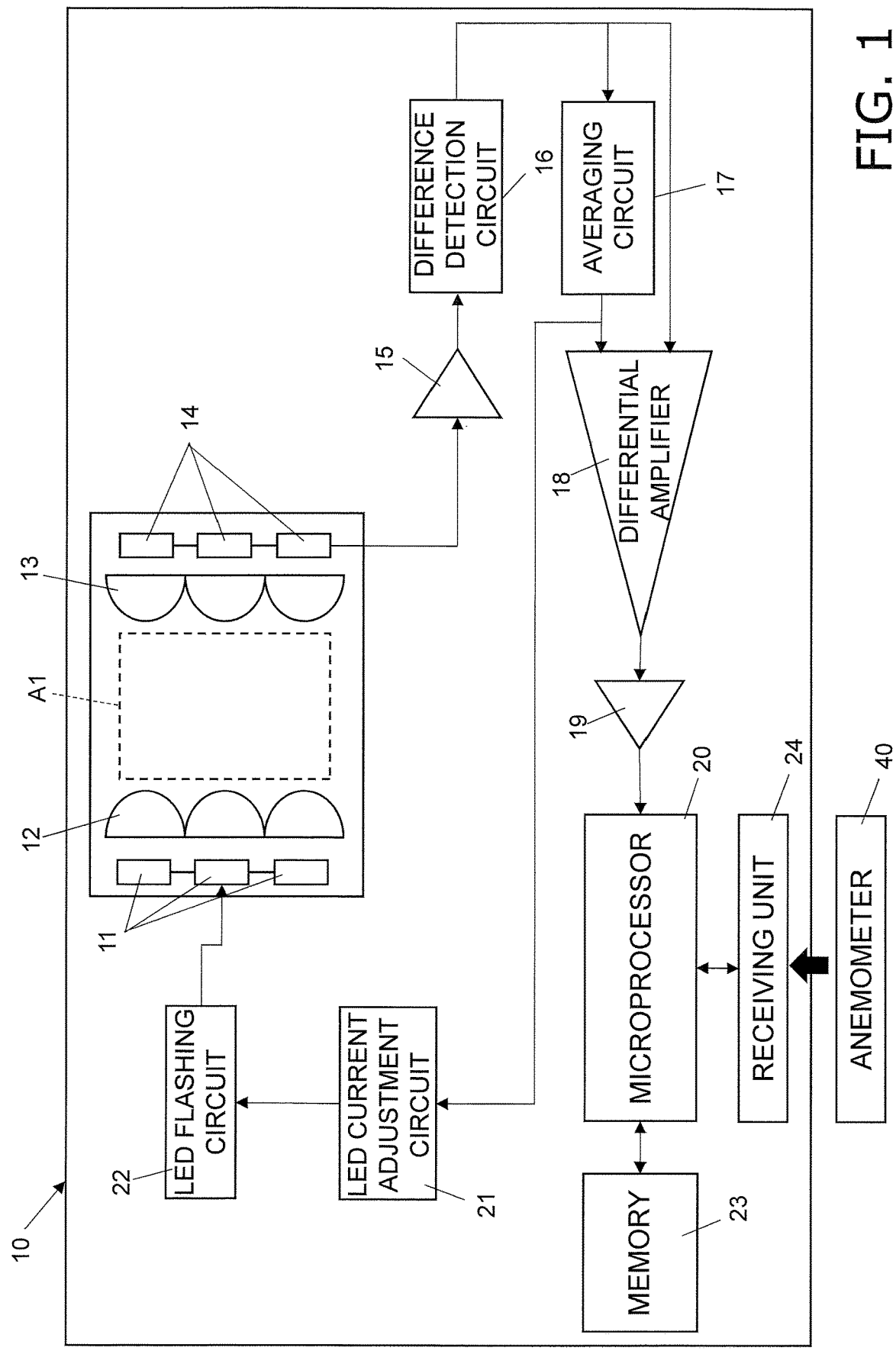
FIG. 1 is a control block diagram showing the configuration of the raindrop detection device according to an embodiment of the present invention.

The raindrop detection device 10 according to this embodiment is a raindrop sensor that detects raindrops that have passed through a specific raindrop detection area A1, and as shown in FIG. 1, comprises a plurality of LEDs (light source units) 11, collimating lenses (first lens units) 12, condensing lenses (second lens units) 13, photodiodes (light receiving units) 14, an amplifier 15, a difference detection circuit (difference output unit) 16, an averaging circuit (averaging processing unit) 17, a differential amplifier 18, an amplifier 19, microprocessor (raindrop detection unit, raindrop speed calculation unit) 20, an LED current adjustment circuit (control unit) 21, an LED flashing circuit (control unit) 22, a memory (storage unit) 23, and a receiving unit 24.

Figure 2:
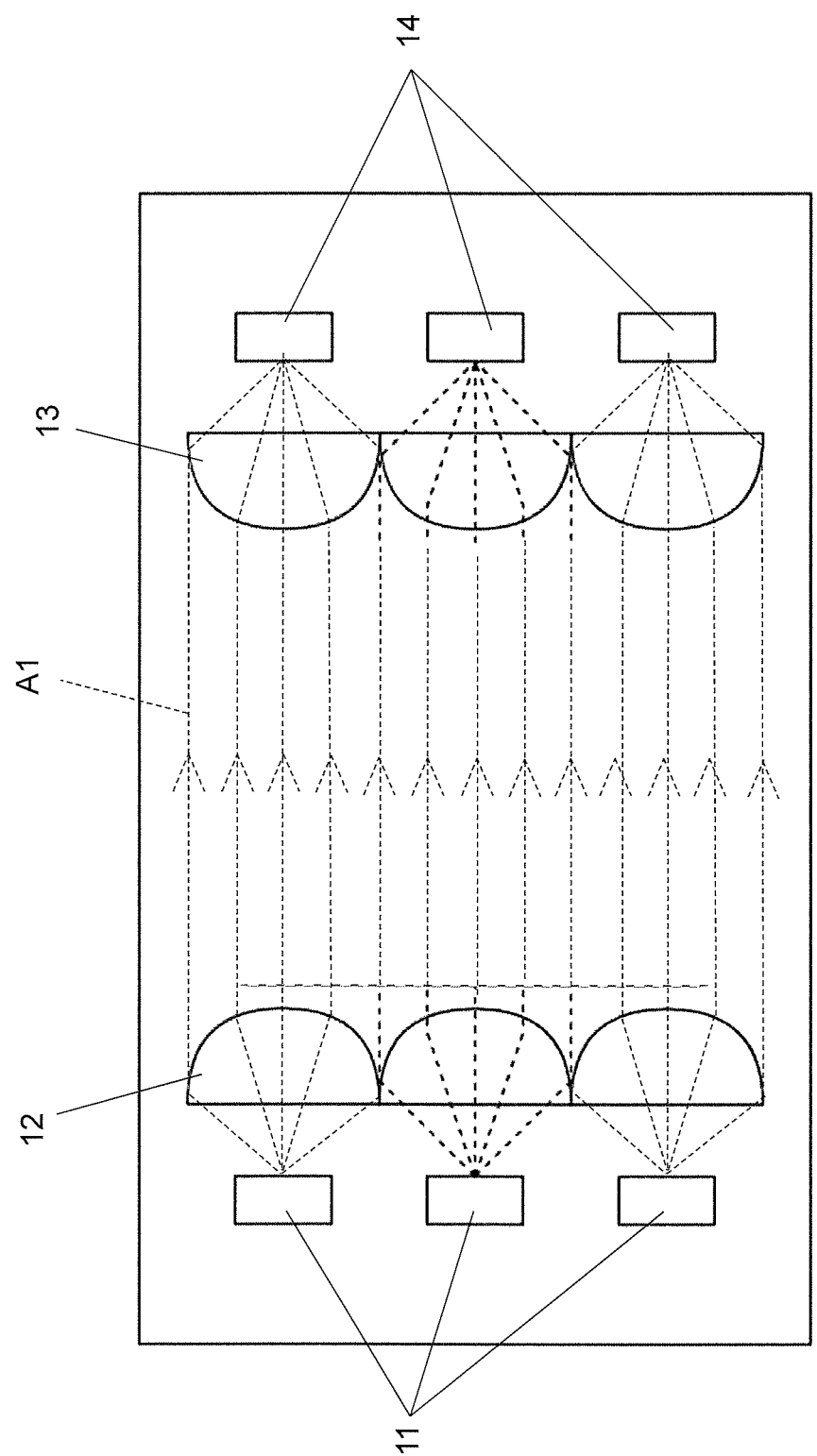
FIG. 2 is a conceptual diagram showing how light collimated by a collimating lens included in the raindrop detection device of FIG. 1 is condensed by condensing lenses.

As shown in FIG. 1, the plurality of LEDs (light source units) 11 are disposed at positions opposite the photodiodes 14 so as to sandwich a raindrop detection area A1 (discussed below). As shown in FIG. 2, each LED 11 emits infrared light toward a photodiode 14 via a collimating lens 12 and a condensing lens 13. The LEDs 11 are controlled by the LED flashing circuit 22 so as to repeatedly turn on and off at a specific pulse width. Also, the current flowing to the LEDs 11 is adjusted and the output (light amount) of the LEDs 11 is adjusted by the LED current adjustment circuit 21.

As shown in FIG. 1, etc., the collimating lenses (first lens units) 12 are cylindrical lenses having a convex shape facing toward the photodiode 14 side, and are disposed adjacent to the side on which the light is emitted from the LEDs 11. As shown in FIG. 2, the collimating lenses 12 convert the light emitted from the LEDs 11 into substantially parallel light.

As shown in FIG. 1, etc., the condensing lenses (second lens units) 13 are cylindrical lenses having a convex shape facing toward the LED 11 side, and are disposed adjacent to the side on which the photodiodes receive light. The condensing lenses 13 condense the light that has been converted into substantially parallel light toward the photodiodes 14, as shown in FIG. 2.

The raindrop detection area A1 is provided between the collimating lenses 12 and the condensing lenses 13, as shown in FIGS. 1 and 2.

The photodiodes (light receiving units) 14 are disposed at positions opposite the LEDs 11, as shown in FIG. 1. The photodiodes 14 receive the light condensed by the condensing lenses 13, as shown in FIG. 2.

As shown in FIG. 1, the raindrop detection area A1 is formed between the photodiodes 14 and the LEDs 11, which are disposed to opposite each other. When raindrops pass through the raindrop detection area A1, some of the light emitted from the LEDs 11 is blocked and the amount of light received by the photodiodes 14 decreases, which makes it possible to detect the presence of raindrops.

The amplifier 15 amplifies the voltage, which varies according to the amount of received light detected at the photodiode 14 and outputs the voltage to the difference detection circuit 16.

The difference detection circuit (difference output unit) 16 calculates the difference (see FIG. 3C) in the amount of received light when the LEDs 11 are lit and unlit (see FIGS. 3A and 3B) in control for repeatedly turning the LEDs 11 on and off (discussed below), and outputs the result to the averaging circuit 17 and the differential amplifier 18.

Here, the graph shown in FIG. 3A shows the relation between the amount of received light (voltage value) at the photodiodes 14 and the elapsed time under an environment in which there is little ambient light coming into the raindrop detection area A1.

That is, in the graph of FIG. 3A, the photodiodes 14 receive light corresponding to 1.0 V when the LEDs 11 are unlit and 2.5 V when the LEDs 11 are lit.

The graph shown in FIG. 3B shows the relation between the amount of light received (voltage value) at the photodiodes 14 and the elapsed time under an environment in which the amount of ambient light coming into the raindrop detection area A1 is greater than that in the environment of FIG. 3A.

That is, in the graph of FIG. 3B, since the environment has a large amount of ambient light, the amount of light received by the photodiodes 14 increases overall compared to the graph in FIG. 3A, with light corresponding to 2.5 V being received when the LEDs 11 are unlit, and 4.0 V when lit.

With the raindrop detection device 10 of this embodiment, as shown in FIGS. 3A and 3B, the LEDs 11 are controlled so that the light emitted from the LEDs 11 is repeatedly turned on and off on the basis of a specific pulse signal. With the raindrop detection device 10, the difference in the amount of light received by the photodiodes 14 when the LEDs are lit and unlit is sensed so as to avoid fluctuations in the amount of light received by the photodiodes 14 due to the influence of ambient light.

More specifically, even in the environment shown in FIG. 3A where there is relatively little ambient light, or in the environment shown in FIG. 3B where there is more ambient light than in the environment shown in FIG. 3B, a voltage value (amount of light received) of 1.5 V can be used as a reference value for raindrop detection by eliminating the influence of ambient light as shown in FIG. 3C.

The averaging circuit (averaging processing unit) 17 averages the difference sensed by the difference detection circuit 16 between when the LEDs 11 are lit and unlit, and outputs the result to the differential amplifier 18 and the LED current adjustment circuit 21.

Consequently, even if the difference temporarily changes due to the detection of raindrops, etc., it is possible to avoid fluctuations in the reference value for raindrop detection (1.5 V in FIG. 3C) caused by temporary fluctuations in the amount of light received, etc.

The differential amplifier 18 amplifies the difference between the reference value (1.5 V in FIG. 3C) averaged by the averaging circuit 17 and the detection result at the difference detection circuit 16, and outputs this to the amplifier 19.

The amplifier 19 inverts the sign (positive or negative) of the output from the differential amplifier 18, amplifies this, and outputs it to the microprocessor 20.

Figure 4B:
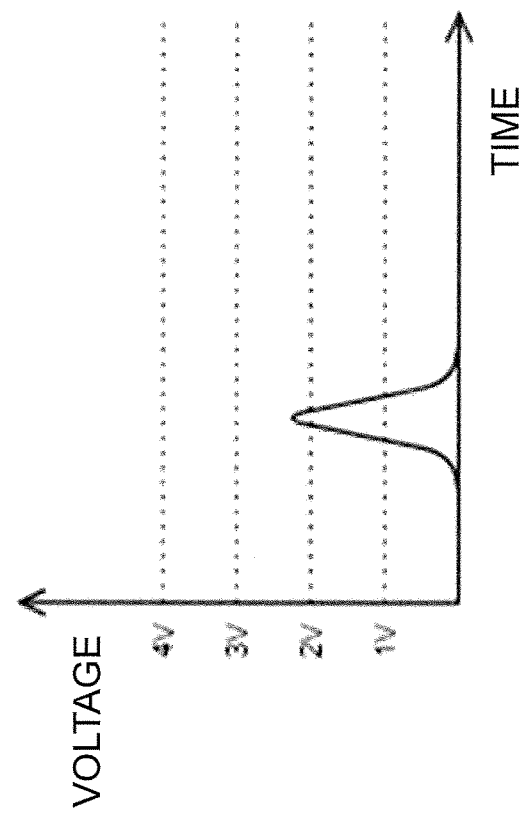
FIG. 4B is a graph obtained by inverting and amplifying the detection result of FIG. 4A.
Figure 4A:
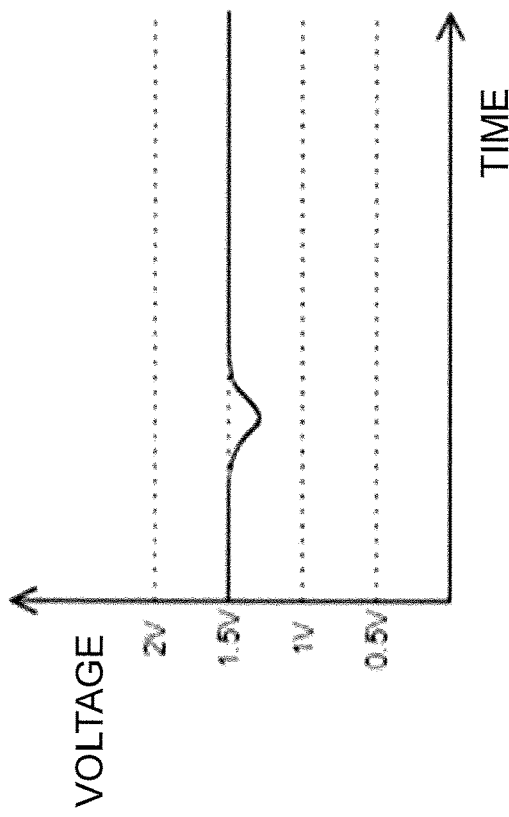
FIG. 4A is a graph showing a state in which raindrops have been detected by extracting the difference in the amount of received light between when the light is on and when the light is off.

That is, as shown in FIG. 4A, when the amount of light received by the photodiodes 14 decreases from the reference value (1.5 V) due to raindrops passing through the raindrop detection area A1, the amplifier 19 converts the change in the voltage value from negative to positive, and amplifies and outputs this voltage.

The microprocessor (raindrop detection unit, raindrop velocity calculation unit, correction unit) 20 detects whether any raindrops have passed through the raindrop detection area A1 on the basis of the output result amplified by the amplifier 19.

That is, raindrops that pass through the raindrop detection area A1 block some of the light emitted from the LEDs 11 and substantially collimated by the collimating lens 12, which allows the microprocessor 20 to detect the presence of raindrops on the basis of the change (decrease) at the photodiodes 14.

More specifically, when the decrease in the amount of light received by the photodiodes 14 exceeds a specific threshold (such as 1.0 V in FIG. 4B), the microprocessor 20 detects that there are raindrops on the basis of the decrease in the amount of light received.

Also, the microprocessor 20 calculates the diameter of a single raindrop on the basis of the decrease in the amount of received light (voltage value) caused by that raindrop, in addition to whether or not any raindrops have passed through the raindrop detection area A1. Then, the microprocessor 20 calculates the volume of that one raindrop from the calculated diameter, sums the volume of raindrops passing through the raindrop detection area A1 per unit of time, and divides this sum by the surface area of the raindrop detection area A1, and can thereby calculate the amount of rainfall per unit of time (1 minute or 1 hour).

The raindrop diameter is calculated by using the following relational expression (1), for example, on the basis of the voltage value outputted from the photodiodes 14.

$$D=3.1544E^{0.6007} \quad (1)$$

(where D is the raindrop diameter, and E is the sensed voltage)

For example, FIG. 5A shows a table indicating the relation between the detection time (ms) of raindrops detected between 4:47:00 and 4:47:59 p.m. on a certain date (year/month/day), the voltage (V), the raindrop diameter (mm), and the volume (mm$^3$).

As discussed above, when a raindrop is detected, the diameter of the raindrop is calculated according to the voltage value outputted from the amplifier 19. Then, the volume of the raindrop is calculated using the following relational expression (2), on the basis of the diameter r of the raindrop.

$$\text{Volume of raindrop}=(4/3)\pi(r/2)^3 \quad (2)$$

Also, as shown in FIG. 5B, the microprocessor 20 calculates the rainfall per minute (0.0057 mm/min) from the total volume (5.621 mm$^3$) of the raindrops that passed through the raindrop detection area A1 during the 59 seconds from 4:47:00 to 4:47:59 p.m. on a certain date (year/month/day), calculates the rainfall per hour (0.3407 mm/h) (=rainfall per minute×60), and stores the results as a table in the memory 23.

Furthermore, the microprocessor 20 calculates the speed of the raindrops on the basis of the detection time (ms) of the raindrops that have passed through the raindrop detection area A1 included in the left-hand column of the table shown in FIG. 5A.

For example, when the precipitation to be detected is rain, the falling speed is the highest among the above, whereas sleet has a falling speed between that of rain and snow, and snow has the slowest falling speed.

It is assumed that with the detection time range (0.4 to 1.1) shown in FIG. 5A, all of the precipitation is water.

Consequently, by sensing the speed of the detected precipitation, it is possible to determine whether the precipitation passing through the raindrop detection area A1 is rain, sleet, or snow.

The microprocessor 20 also corrects the rainfall per unit of time calculated by the microprocessor 20 on the basis of the wind speed received from an anemometer 40 via the receiving unit 24.

Figure 6B:
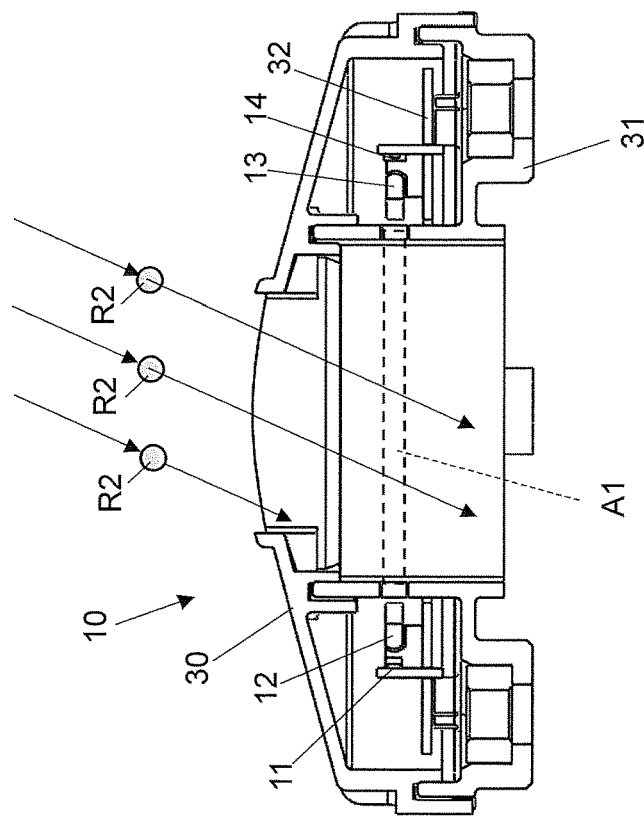
FIG. 6B is a cross-sectional view showing a state in which raindrops have fallen obliquely to raindrop detection device of FIG. 1.
Figure 6A:
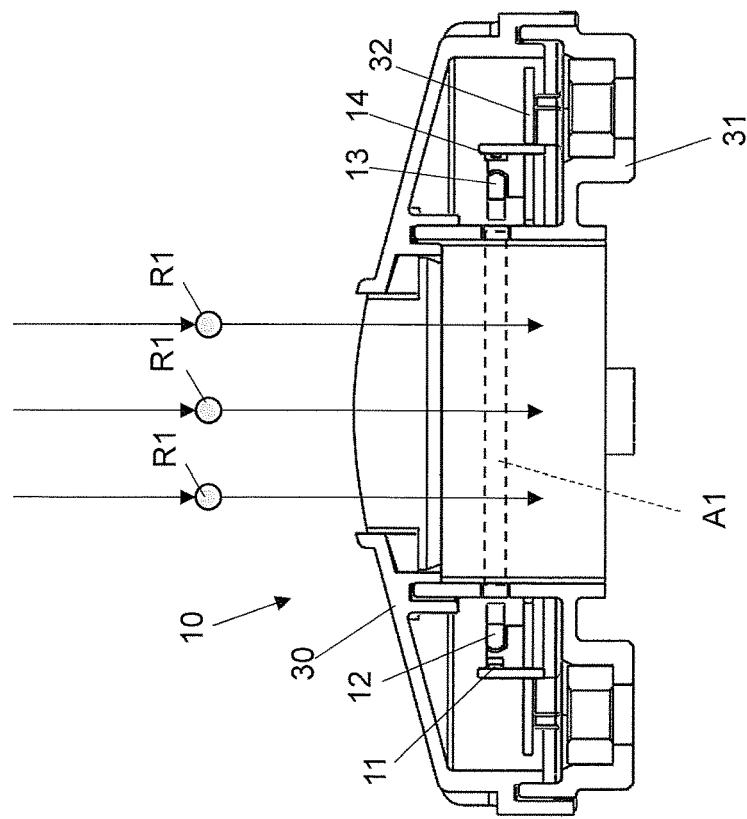
FIG. 6A is a cross-sectional view showing a state in which raindrops have fallen in a direction substantially perpendicular to the raindrop detection device of FIG. 1.

More specifically, as shown in FIG. 6A, in a configuration in which the raindrop detection device 10 comprises a substantially cylindrical cover 30, a substantially cylindrical base 31, and a substantially disc-shaped board 32, the raindrop detection area A1 is provided to the cylindrical portion formed at the center of the cover 30 and the base 31.

The LEDs 11 and the photodiodes 14 are disposed on the board 32 on both sides of the raindrop detection area A1, so as to sandwich the raindrop detection area A1. the collimating lenses 12 are disposed adjacent to each other on the board 32 on the side of the LEDs 11 on which light is emitted. The condensing lenses 13 are disposed adjacent to each other on the board 32 on the side of the photodiodes 14 on which light is received.

With this configuration, when raindrops R1 are falling substantially vertically, as shown in FIG. 6A, almost all of the raindrops R1 pass through the raindrop detection area A1, with respect to the surface area of the raindrop detection area A1.

On the other hand, when the raindrops R2 are falling obliquely with respect to the substantially vertical direction, as shown in FIG. 6B, some of them may hit the cover 30 or the like and not pass through the raindrop detection area A1, with respect to the surface area of the raindrop detection area A1.

The amount of raindrops R2 that do not pass through the raindrop detection area A1 will vary with the wind speed in the environment where the raindrop detection device 10 is installed.

Figure 7:
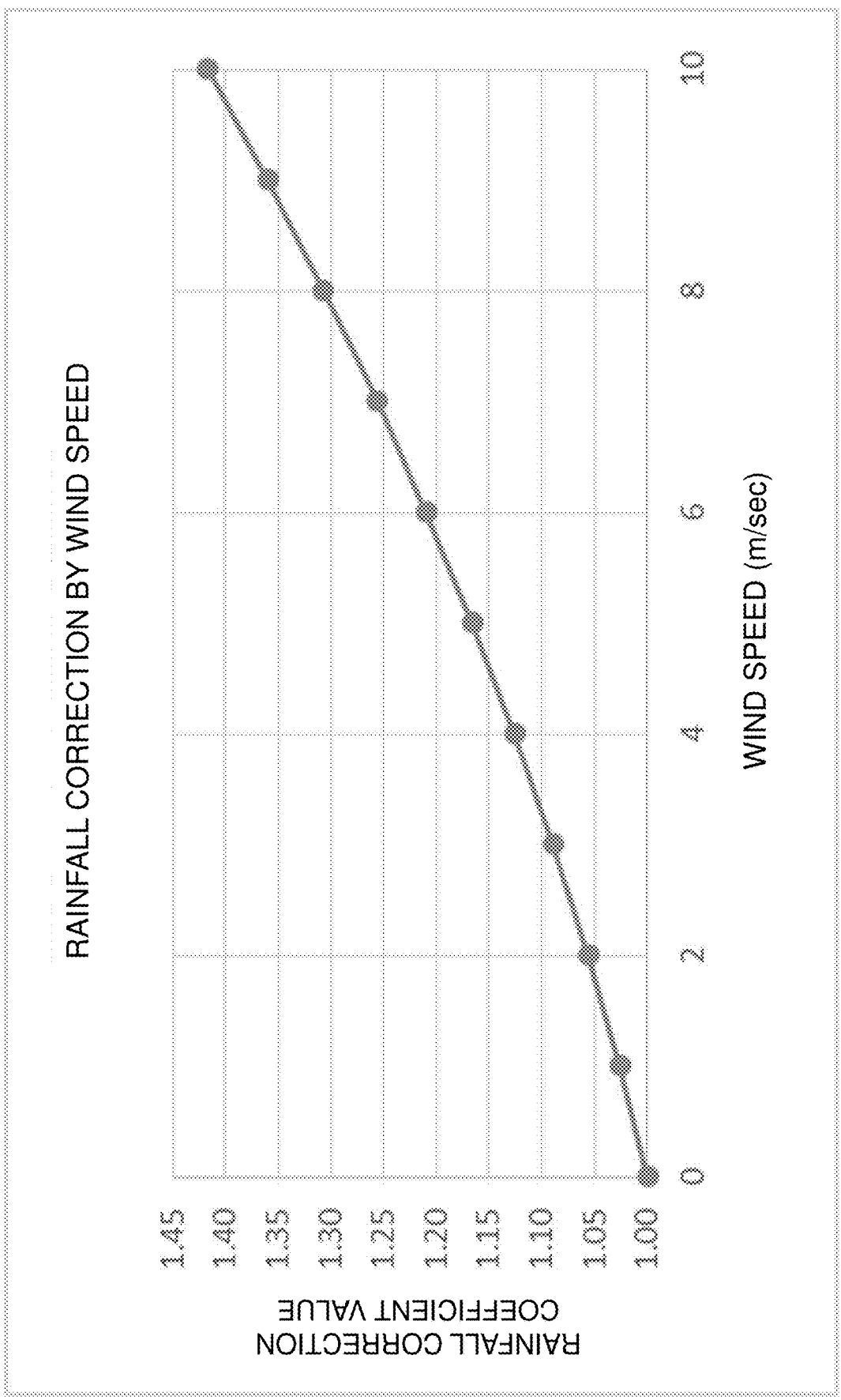
FIG. 7 is a graph showing the relationship between the wind speed and the correction coefficient value used for rainfall correction in the raindrop detection device of FIG. 1.

Therefore, with the raindrop detection device 10 of this embodiment, the amount of rain detected by the raindrop detection device 10 is corrected according to the wind speed, with reference to the table shown in FIG. 7.

More precisely, when the wind speed is 2.0 m/sec, for example, the rainfall is corrected by multiplying the rainfall by a correction coefficient of 1.05, as shown in FIG. 7. As shown in FIG. 7, the correction coefficient increases along with the wind speed, and is about 1.13 at a wind speed of 4.0 m/sec, about 1.21 at a wind speed of 6.0 m/sec, about 1.31 at a wind speed of 8.0 m/sec, and about 1.42 at a wind speed of 10.0 m/sec.

This avoids the problem of detecting less rainfall than the actual amount due to high wind, so the amount of rain can be sensed more accurately.

The LED current adjustment circuit (control unit) 21 receives a reference value (1.5 V in the example of FIG. 3C) obtained by averaging the output from the difference detection circuit 16 outputted from the averaging circuit 17, and controls the current flowing through the LEDs 11 so that this reference value will remain substantially constant.

Figure 8:
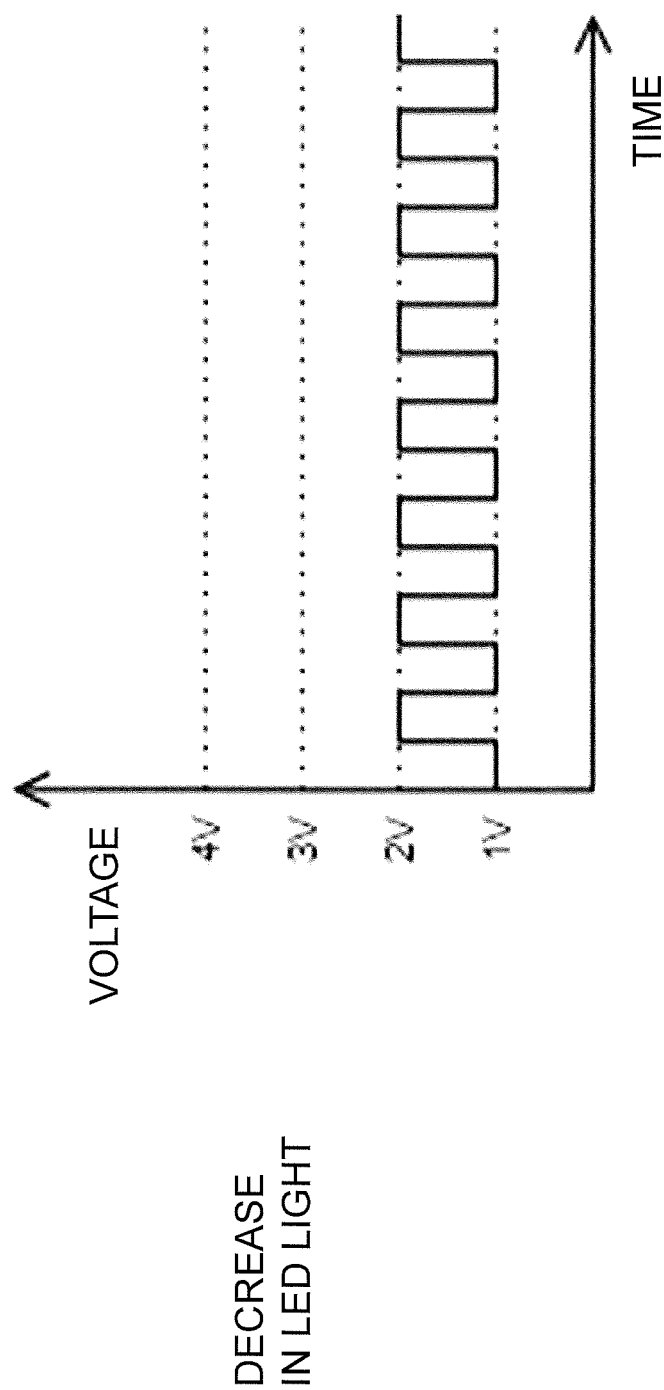
FIG. 8 is a graph illustrating a state in which the amount of light received by a photodiode has decreased due to fogging of the lens or the like in the raindrop detection device of FIG. 1.

That is, if the reference value detected by the photodiodes 14 and amplified by the amplifier 15 has decreased from 1.5 V (see FIG. 3A) to the 1.0 V shown in FIG. 8 (the difference between 1.0 V and 2.0 V), for example, the LED current adjustment circuit 21 increases the current flowing through the LEDs 11 and performs feedback control so that the reference value goes to 1.5 V.

This decrease in the reference value occurs, for example, due to the deterioration of the LEDs 11 over time, fogging of the collimating lenses 12 or the condensing lenses 13, deterioration of the photodiodes 14 over time, and the like.

Consequently, the above feedback control can prevent a decrease in the raindrop detection accuracy due to a decrease in the amount of received light attributable to deterioration of the LEDs 11, the lenses 12 and 13, the photodiodes 14, and the like over time, rather than effect of raindrops that have passed through the raindrop detection area A1.

The LED flashing circuit (control unit) 22 controls the LEDs 11 so that the light emitted from the LEDs 11 is repeatedly turned on and off by a specific pulse signal. More specifically, as shown in FIG. 3A, etc., the LED flashing circuit 22 controls the LEDs 11 to turn on for a certain length of time and turn off for a certain length of time.

As a result, as discussed above, the LEDs 11 are controlled to repeatedly turn on and off, which allows raindrops to be detected accurately by using the difference between the two states as a reference value to detect raindrops, thereby suppressing the effects of ambient light.

The memory (storage unit) 23 stores a table containing the relation between voltage and raindrop diameter when detecting the raindrops shown in FIGS. 5A and 5B, the volume, the rainfall per unit time, and so forth, the correction table shown in FIG. 7, and the like.

As discussed above, the receiving unit 24 receives wind speed data from the anemometer 40 installed in the environment where the raindrop detection device 10 is installed, and transmits this data to the microprocessor 20.

Figure 9:
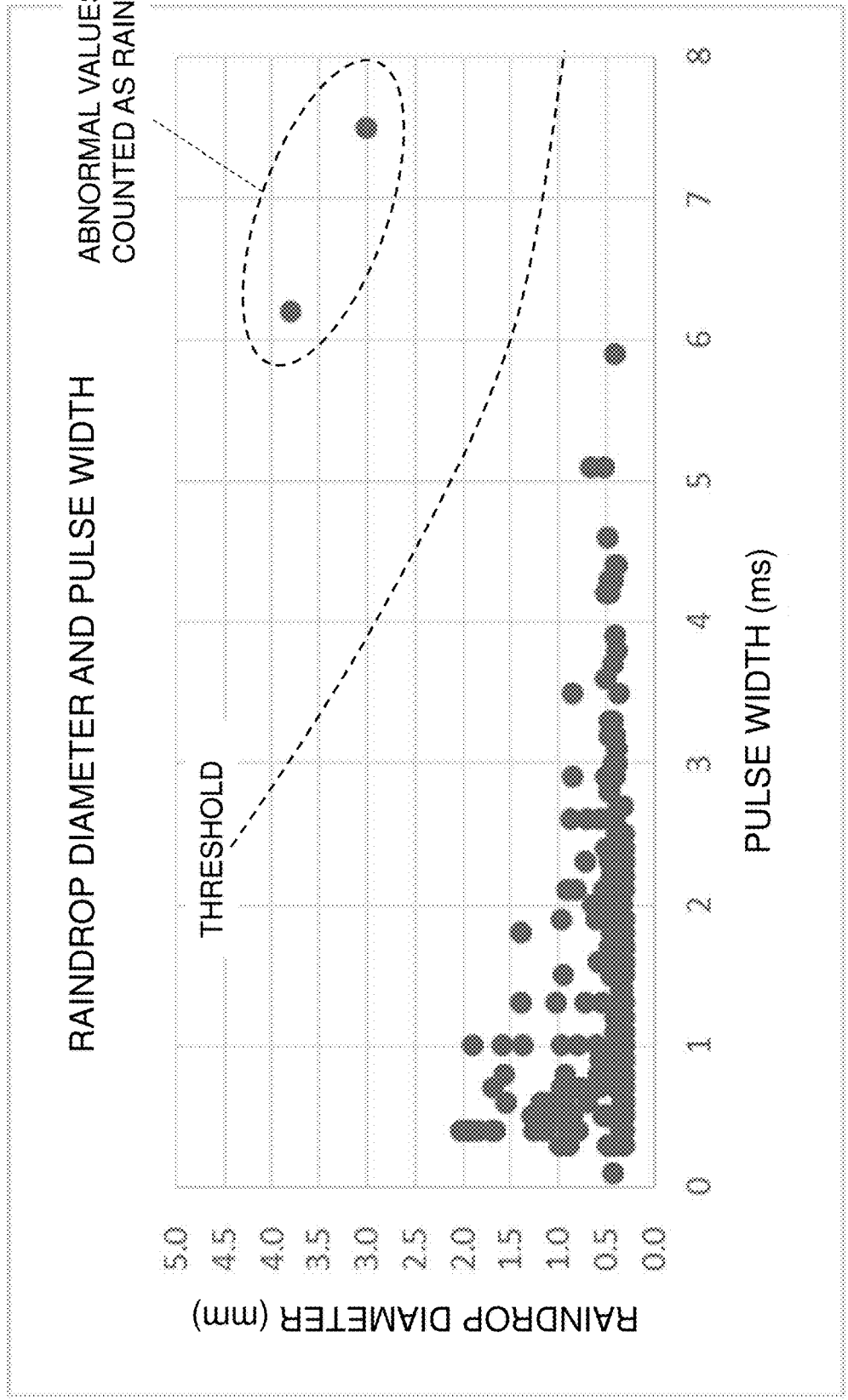
FIG. 9 is a graph of the relation between raindrop diameter and pulse width for monitoring the pulse signal indicating the amount of light received by the photodiode in the raindrop detection device of FIG. 1 and excluding this signal from the raindrop count.

Also, as shown in FIG. 9, with the raindrop detection device 10 in this embodiment, when the presence of raindrops is detected on the basis of a change in the amount of received light, the microprocessor 20 senses the pulse width of the light received by the photodiodes 14 when raindrops are detected, and if this pulse width exceeds a specific threshold value (such as 6.0 ms), it is determined that there are no raindrops.

That is, the larger is the diameter of a raindrop, the faster is its rate of fall, so the pulse width becomes smaller. On the other hand, if the raindrop diameter is large and the pulse width is large, it can be determined that there is a possibility of foreign matter other than raindrops, such as fallen leaves, or other such malfunction.

Consequently, even when raindrops are detected, the pulse width in that detection is monitored, and if the pulse width exceeds a specific threshold value, that detection is not counted as a raindrop, thereby preventing foreign matter from being erroneously counted as a raindrop, or malfunction of the raindrop detection device 10 can be detected.

Raindrop Detection Method Used by Raindrop Detection Device 10

Figure 10:
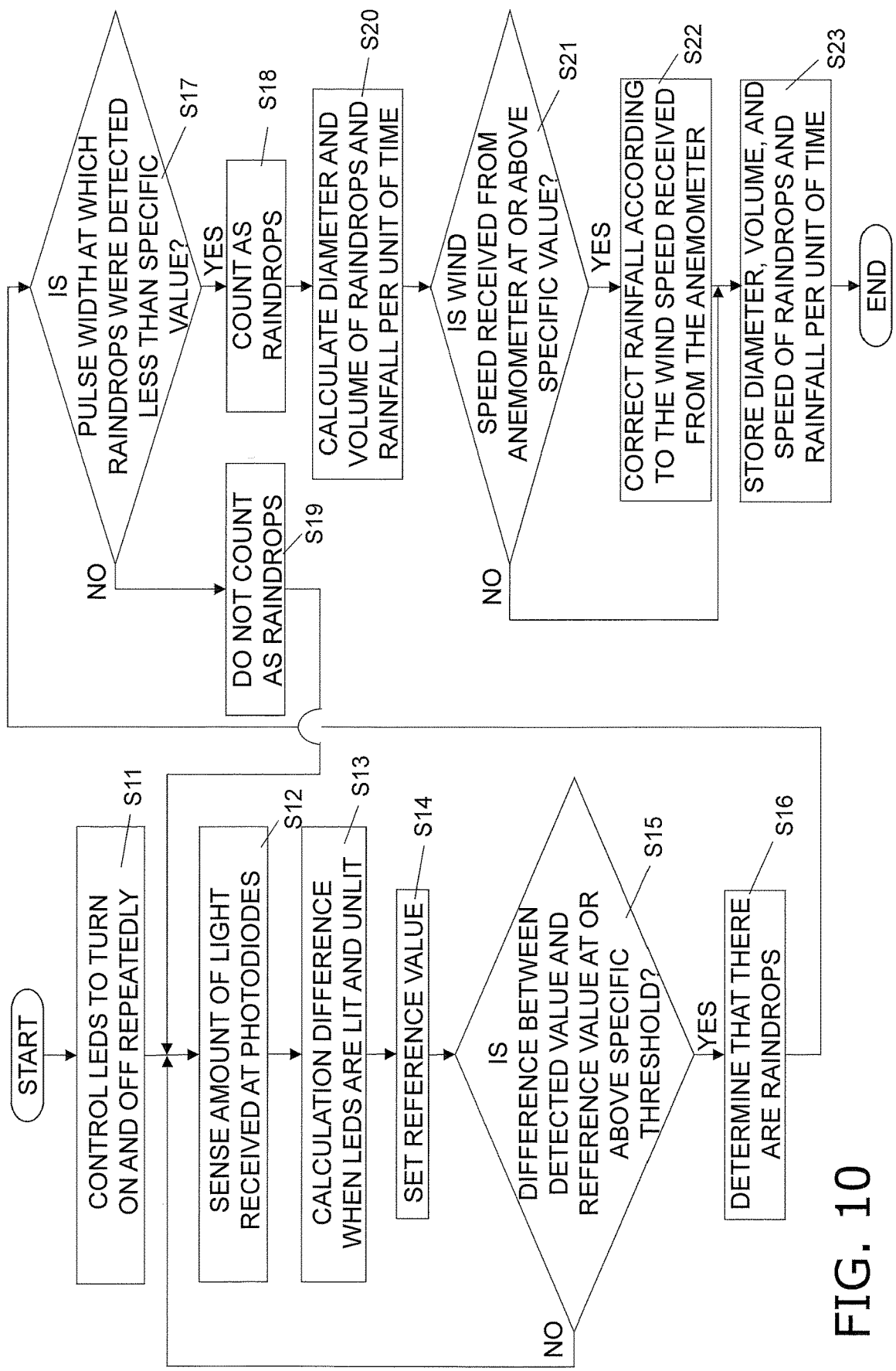
FIG. 10 is a flowchart showing the flow of processing in a raindrop detection method employed by the raindrop detection device of FIG. 1.

The raindrop detection device 10 in this embodiment detects raindrops that have passed through the raindrop detection area A1, according to the flowchart shown in FIG. 10.

That is, in step S11 the LED flashing circuit 22 controls the LEDs 11 on the basis of a pulse signal so that the LEDs 11 are repeatedly turned on and off at specific time intervals.

Next, in step S12 the photodiodes 14 receive the light emitted from the LEDs 11 and sense the amount of received light.

Next, in step S13 the difference in the detection results of the photodiodes 14 when the LEDs 11 are lit and unlit is calculated.

Next, in step S14 the difference calculated in step S13 is set as a reference value for detecting raindrops.

Next, in step S15 it is determined whether or not the difference between the reference value set in step S14 and the amount of change (decrease) in the amount of received light actually sensed by the photodiodes 14 is at or above a specific threshold. Here, if the difference is at or above the specific threshold, the processing proceeds to step S16, and if the difference is below the specific threshold, the processing goes back to step S12.

Next, in step S16, since it was determined in step S15 that the difference was at or above the specific threshold value, it is determined that raindrops are present from the detection value corresponding to that difference.

Next, in step S17 it is determined whether or not the pulse width when raindrops are detected is less than a specific value. Here, if the pulse width is less than the specific value, the processing proceeds to step S18, and if the pulse width is at or above the specific value, the processing proceeds to step S19.

Next, in step S18, since it was determined in step S17 that the pulse width when raindrops were detected was less than the specific value, it is determined that this is not something other than raindrops (such as fallen leaves), and is counted as raindrops.

On the other hand, in step S19, since it was determined in step S17 that the pulse width when raindrops were detected was equal to or greater than the specific value, it is determined that there is a high probability that it was something other than raindrops (such as fallen leaves), so this is not counted as raindrops, and the processing goes back to step S12.

Next, in step S20 the diameter and volume of raindrops and the amount of rainfall per unit of time are calculated from the voltage value at which the raindrops counted as raindrops were detected.

Next, in step S21 the receiving unit 24 receives wind speed data from the anemometer 40, and determines whether or not the wind speed when raindrops were detected is equal to or greater than a specific value. Here, if the wind speed is equal to or higher than the specific value, the processing proceeds to step S22, and if it is less than the specific value, step S22 is skipped and the processing proceeds to step S23.

Next, in step S22, since it was determined in step S21 that the wind speed was equal to or greater than the specific value, the rainfall calculated in step S20 is corrected according to the wind speed in order to eliminate variance in the rainfall due to the influence of the wind speed.

Next, in step S23, since it was determined in step S21 that the wind speed was less than the specific value, or the rainfall was corrected according to the wind speed in step S22, the diameter, volume, and speed of the raindrops and the amount of rainfall per unit of time are saved in the memory 23, and the processing is ended.

Main Features

The raindrop detection device 10 of this embodiment comprises the LEDs 11, the photodiodes 14, the microprocessor 20, and the LED flashing circuit 22. The LEDs 11 emit light in a specific direction. The photodiodes 14 are disposed at positions opposite the LEDs 11 and receive the light emitted from the LEDs 11. The microprocessor 20 detects raindrops passing between the LEDs 11 and the photodiodes 14 according to the change in the amount of light received by the photodiodes 14. The LED flashing circuit 22 controls how the LEDs 11 are turned on and off.

As a result, the change in the amount of light received at the photodiodes 14 is sensed while the LED flashing circuit 22 repeatedly turns on and off the light emitted from the LEDs 11, and this allows raindrops to be detected while the influence of ambient light is eliminated by, for example, subtracting the amount of light received when the LEDs 11 are unlit from the amount of light received when the LEDs 11 are lit.

Other Embodiments

An embodiment of the present invention was described above, but the present invention is not limited to or by the above embodiment, and various modifications are possible without departing from the gist of the invention.

(A)

In the above embodiment, an example was given in which a raindrop detection device and method were described as an example of working the present invention. However, the present invention is not limited to this.

For example, the present invention may be realized as a raindrop detection program that causes a computer to execute the above-mentioned method of a raindrop detection device.

This raindrop detection program is stored in a memory (storage unit) that is installed in the raindrop detection device, and the CPU reads the raindrop detection program stored in the memory and causes the hardware to execute the various steps. More specifically, the same effect as described above can be achieved by having the CPU read the raindrop detection program and execute the above-mentioned irradiation step, the light receiving step, and raindrop detection step.

Also, the present invention may be realized as a recording medium on which a raindrop detection program is stored.

(B)

In the above embodiment, as shown in FIGS. 1 and 2, an example was given in which the light emitted from the LEDs 11 was collimated by the collimating lenses 12, and the collimated light passing through the raindrop detection area A1 was condensed by the condensing lenses 13 and received by the photodiodes 14. However, the present invention is not limited to this.

Figure 11:
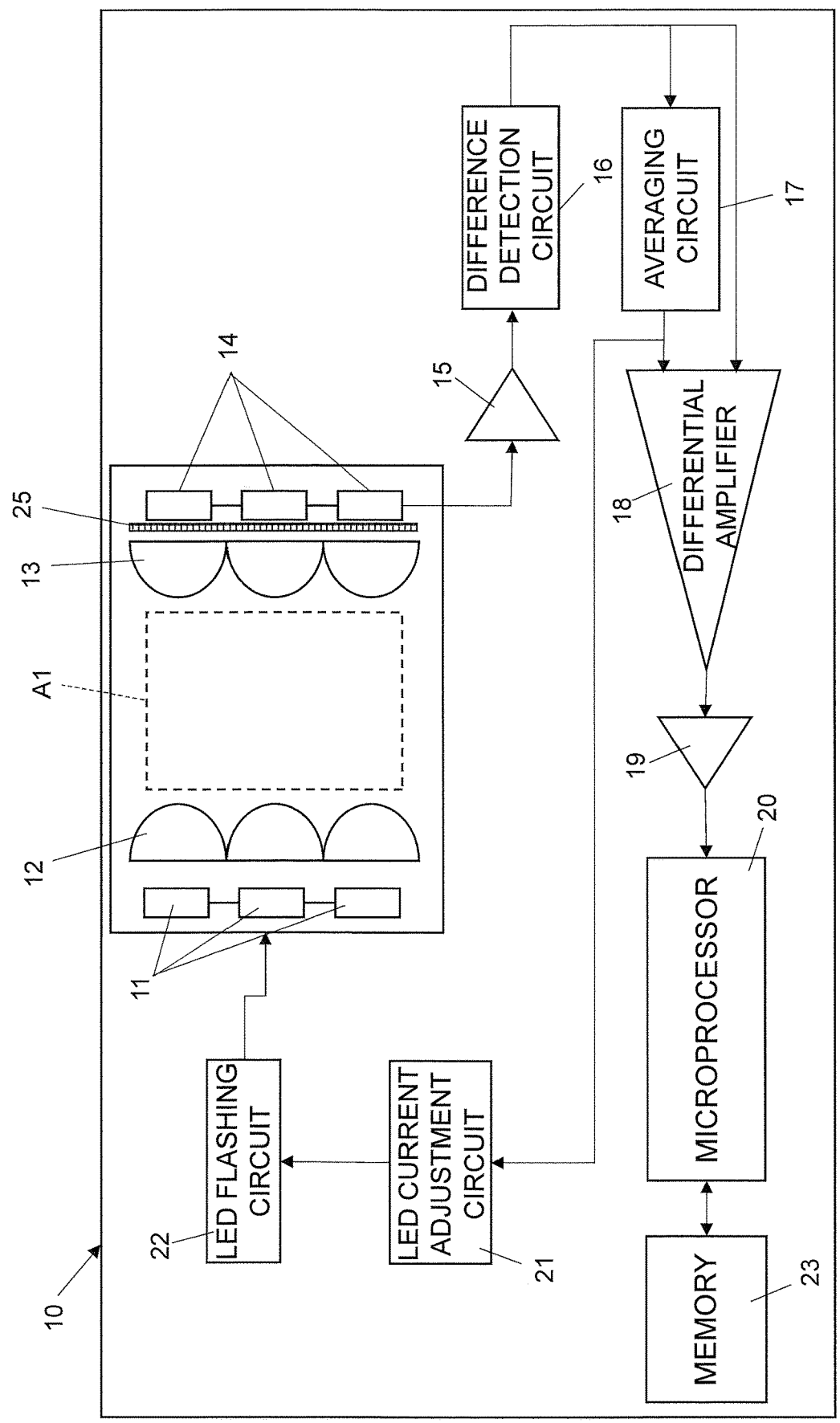
FIG. 11 is a control block diagram showing the configuration of a raindrop detection device according to another embodiment of the present invention.

For example, as shown in FIG. 11, a blocking filter 25 that blocks visible light may be disposed on the upstream side of the photodiodes 14, in between the condensing lenses 13 and the photodiodes 14, in the direction in which the light emitted from the LEDs 11 travels.

Consequently, with this configuration visible light is not incident on the photodiodes 14, so the influence of ambient light can be eliminated, and raindrops can be detected more accurately.

(C)

In the above embodiment, an example was given in which raindrops were detected by having the microprocessor 20 output the difference between the amount of light received by the photodiodes 14 when the LEDs 11 were lit and the amount of light received by the photodiodes 14 when the LEDs 11 were unlit. However, the present invention is not limited to this.

For example, raindrops may be detected by detecting the change in the amount of light received by the photodiodes in a state in which the LEDs are lit constantly.

However, detecting raindrops by performing control as in the above embodiment is preferable in that the influence of ambient light can be eliminated by using the difference in the amount of light received when the LEDs are lit and unlit as described above.

(D)

In the above embodiment, an example was given in which feedback control was performed to adjust the output of the LEDs 11 so that the difference between the amount of light received by the photodiodes 14 when the LEDs 11 were lit and the amount of light received by the photodiodes 14 when the LEDs 11 were unlit would be substantially constant. However, the present invention is not limited to this.

For example, control to detect raindrops may be performed without performing feedback control.

(E)

In the above embodiment, an example was given in which the LEDs 11 were used as the light source unit. However, the present invention is not limited to this.

For example, the above-mentioned raindrop detection may be performed using a light source unit other than LEDs.

(F)

In the above embodiment, an example was given in which the photodiodes 14 were used as the light receiving unit. However, the present invention is not limited to this.

For example, the above-mentioned raindrop detection may be performed using a light receiving unit other than a photodiode.

(G)

In the above embodiment, an example was given in which the LEDs 11 emitted infrared light were used as the light source unit. However, the present invention is not limited to this.

For example, in a usage environment where sunlight or other such visible light can be blocked, the raindrop detection device may comprise a light source unit such as an LED that emits visible light.

(H)

In the above embodiment, an example was given in which the wind speed in the environment where the raindrop detection device 10 was installed was received from the anemometer 40 in real time, and the detected rainfall amount was corrected according to the wind speed. However, the present invention is not limited to this.

For example, if the raindrop detection device is installed in an environment that is not affected by the wind, it will not be necessary to receive the wind speed from an anemometer and correct the amount of rain detected, so the raindrop detection device need not have a receiving unit that receives wind speed from an anemometer in real time, as shown in FIG. 11.

INDUSTRIAL APPLICABILITY

The raindrop detection device of the present invention can be widely applied as a rainfall sensor, a rain-activated sensor, or a weather sensor because it exhibits the effect of allowing accurate detection of even a small amount of rain, from when the rain starts to fall.

REFERENCE SIGNS LIST 10 raindrop detection device
11 LED (light source unit)
12 collimating lens (first lens unit)
13 condensing lens (second lens unit)
14 photodiode (light receiving unit)
15 amplifier
16 difference detection circuit (difference output unit)
17 averaging circuit (averaging processing unit)
18 differential amplifier
19 amplifier
20 microprocessor (raindrop detection unit, raindrop speed calculation unit, correction unit)
21 LED current adjustment circuit (control unit)
22 LED flashing circuit (control unit)
23 memory (storage unit)
24 receiving unit
25 blocking filter
30 cover
31 base
32 board
40 anemometer
A1 raindrop detection area
R1, R2 raindrop

The invention claimed is:

1. A raindrop detection device, comprising:
a light source unit configured to emit light in a specific direction;
a light receiving unit that is disposed at a position opposite the light source unit and configured to receive the light emitted from the light source unit;
a raindrop detection unit configured to detect raindrops that have passed between the light source unit and the light receiving unit according to a change in an amount of light received by the light receiving unit; and
a control unit configured to control on and off switching of the light emitted from the light source unit, wherein
the control unit performs control so as to repeatedly turn the light source unit on and off, and
the light receiving unit has a difference output unit configured to output a difference in the amount of light received when the light source unit is lit and when the light source unit is unlit, as a voltage.

2. The raindrop detection device according to claim 1, wherein the control unit performs feedback control to change an output of the light source unit so that the difference stays constant.

3. The raindrop detection device according to claim 2, further comprising an averaging processing unit configured to average the difference and transmit a result to the control unit.

4. The raindrop detection device according to claim 1, wherein a plurality of the light source units are provided.

5. The raindrop detection device according to claim 1, further comprising a first lens unit configured to convert the light emitted from the light source unit into parallel light.

6. The raindrop detection device according to claim 5, further comprising a second lens unit configured to condense the light collimated by the first lens unit and guide this light to the light receiving unit.

7. The raindrop detection device according to claim 1, wherein the light source unit emits infrared light.

8. The raindrop detection device according to claim 1, further comprising a blocking filter that is provided on a light receiving surface side of the light receiving unit and configured to block visible light.

9. A raindrop detection method that makes use of the raindrop detection device according to claim 1, the method comprising:
an emission step of emitting light in a specific direction from the light source;
a light receiving step of receiving the light emitted from the light source unit at the light receiving unit, which is disposed at a position opposite the light source unit; and
a raindrop detection step of detecting raindrops that have passed between the light source unit and the light receiving unit, according to the change the amount of light received in the light receiving step.

10. A raindrop detection program that causes a computer to execute a raindrop detection method that makes use of the raindrop detection device according to claim 1, the method comprising:
an emission step of emitting light in a specific direction from the light source;
a light receiving step of receiving the light emitted from the light source unit at the light receiving unit, which is disposed at a position opposite the light source unit; and
a raindrop detection step of detecting raindrops that have passed between the light source unit and the light receiving unit, according to the change in the amount of light received in the light receiving step.

11. A raindrop detection device, comprising:
a light source unit configured to emit light in a specific direction;
a light receiving unit that is disposed at a position opposite the light source unit and configured to receive the light emitted from the light source unit;

a raindrop detection unit configured to detect raindrops that have passed between the light source unit and the light receiving unit according to a change in an amount of light received by the light receiving unit; and a control unit configured to control on and off switching of the light emitted from the light source unit, wherein the raindrop detection unit senses a diameter of one raindrop on the basis of a decrease in a difference in the amount of received light when the light source unit is lit and when the light source unit is unlit.

12. The raindrop detection device according to claim 11, wherein the raindrop detection unit calculates a volume of one raindrop on the basis of the diameter.

13. A raindrop detection device, comprising:

a light source unit configured to emit light in a specific direction;

a light receiving unit that is disposed at a position opposite the light source unit and configured to receive the light emitted from the light source unit;

a raindrop detection unit configured to detect raindrops that have passed between the light source unit and the light receiving unit according to a change in an amount of light received by the light receiving unit; and a control unit configured to control on and off switching of the light emitted from the light source unit, wherein the raindrop detection unit calculates a volume of one raindrop on the basis of a decrease in the amount of received light.

14. The raindrop detection device according to claim 13, wherein the raindrop detection unit sums the volume of the raindrops that have passed between the light source unit and the light receiving unit per specific unit of time from the volume of one raindrop, and divides this sum by a surface area of an area where the raindrops are detected, and thereby calculates the amount of rainfall per unit of time.

15. A raindrop detection device, comprising:

a light source unit configured to emit light in a specific direction;

a light receiving unit that is disposed at a position opposite the light source unit and configured to receive the light emitted from the light source unit;

a raindrop detection unit configured to detect raindrops that have passed between the light source unit and the light receiving unit according to a change in an amount of light received by the light receiving unit;

a control unit configured to control on and off switching of the light emitted from the light source unit;

a receiving unit configured to receive information related to wind speed conditions; and a correction unit configured to correct an amount of rain per unit of time sensed by the raindrop detection unit according to the wind speed conditions received by the receiving unit.

16. A raindrop detection device, comprising:

a light source unit configured to emit light in a specific direction;

a light receiving unit that is disposed at a position opposite the light source unit and configured to receive the light emitted from the light source unit;

a raindrop detection unit configured to detect raindrops that have passed between the light source unit and the light receiving unit according to a change in an amount of light received by the light receiving unit; and a control unit configured to control on and off switching of the light emitted from the light source unit, wherein if a presence of raindrops is detected on the basis of a change in the amount of received light, the raindrop detection unit senses a pulse width of the light received by the light receiving unit when the raindrops were detected, and determines there are no raindrops if the detected pulse width exceeds a specific threshold.

17. The raindrop detection device according to claim 16, wherein the raindrop detection unit determines whether or not there are raindrops on the basis of the pulse width and a decrease in the amount of received light.

18. A raindrop detection device, comprising:

a light source unit configured to emit light in a specific direction;

a light receiving unit that is disposed at a position opposite the light source unit and configured to receive the light emitted from the light source unit;

a raindrop detection unit configured to detect raindrops that have passed between the light source unit and the light receiving unit according to a change in an amount of light received by the light receiving unit;

a control unit configured to control on and off switching of the light emitted from the light source unit; and a raindrop speed calculation unit configured to calculate a speed of the raindrops on the basis of a light blocking duration by the raindrops that have passed between the light source unit and the light receiving unit.

* * * * *